Patented Dec. 1, 1931

1,834,876

UNITED STATES PATENT OFFICE

WILLIAM SMITH AND JOHN THOMAS, OF GRANGEMOUTH, SCOTLAND, ASSIGNORS TO SCOTTISH DYES LIMITED, OF GRANGEMOUTH, SCOTLAND

PRODUCTION OF DYESTUFF INTERMEDIATES

No Drawing. Application filed April 22, 1930, Serial No. 446,299, and in Great Britain April 16, 1929.

This invention relates to the production of dyestuff intermediates and more particularly to the production of dianthraquinonyl derivatives containing chlorine, bromine or sulphonic acid groups in the 2:2' positions.

The object of the present invention is to provide improved or modified processes for producing such substances.

As a result of researches we have found among other things that we can obtain valuable 1:1'-dianthraquinonyl derivatives containing acid substituents in the 2:2'-positions, such as chlorine, bromine or sulphonic acid groups by taking anthraquinone derivatives containing chlorine, bromine or sulphonic acid substituents in the 2-position and chlorine or bromine in the 1-position and heating with copper powder.

The anthraquinone derivative containing the halogen atom in the alpha-position, for instance, bromine, may be obtained by starting from 1-amino-2-sulpho-anthraquinone and replacing the amino group, for instance, bromine, and then after replacement, the treatment with a metallic powder can be carried out.

The invention in brief consists in the process which comprises the production of 1:1'-dianthraquinonyls containing acid substituents in the 2:2'-positions or their derivatives by the condensation of anthraquinone derivatives containing acid substituents in the 2-position and reactive groups in the 1-position, or their derivatives.

The invention also consists in the process which comprises the production of 1:1'-dianthraquinonyls containing acid substituents in the 2:2'-positions such as chlorine, bromine or sulphonic acid groups, by taking anthraquinone derivatives containing a halogen substituent in the 1-position and an acid substituent in the 2-position such as chlorine, bromine or sulphonic acid and treating with copper, special importance being attached to the production of 1:1'-dianthraquinonyl derivatives containing acid substituents in the 2:2'-position in which the acid substituents are halogen atoms, particularly chlorine atoms.

The invention also consists in processes substantially as described, in products when made by those processes or by their obvious chemical equivalents.

The accompanying diagram illustrates what may be regarded as the structural formula of the 2:2'-dichlor-1:1'-dianthraquinonyl to which we refer herein.

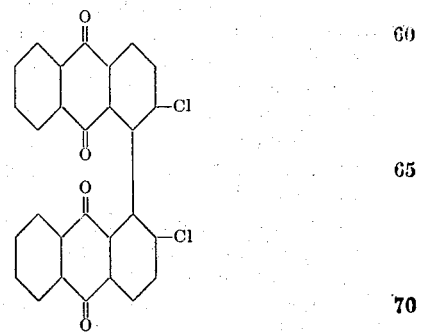

The following examples illustrate how the invention may be carried into effect, references to parts and to percentages being to parts and percentages by weight:—

Example 1

This is an example of the production of 2:2'-dichlor-1:1'-dianthraquinonyl from 1:2-dichlor-anthraquinone.

10 parts of 1:2-dichlor-anthraquinone and 5 parts of copper powder are boiled with 20 parts of nitrobenzene for several hours, while the mixture is kept well stirred. The product is isolated by steam distillation of the nitrobenzene. The copper is removed by warming in 10 per cent. nitric acid. The crude product may be purified by recrystallization from nitrobenzene. It is a pale yellow colour and melts above 300° C.

Example 2

This illustrates the production of 1:1'-dianthraquinonyl derivatives containing acid substituents in the 2:2'-position in which the acid substituents are halogen atoms.

2 parts 1.2-dibrom-anthraquinone
1 part copper
4 parts naphthalene.

The above mixture is well stirred at the boil for several hours, and after cooling to about 120°, 4 parts solvent naphtha are added and the mixture filtered at 100° C. washed with solvent naphtha and dried. The excess copper is removed by boiling with dilute nitric acid filtered, washing acid free, and dried. The product is a pale yellow crystalline powder.

*General*

The invention is not limited to the above examples.

The group in the $\alpha$ position may consist, for instance, of an acid group, for example, a halogen, or it may consist of an amino group and condensation may be carried out by treating the acid group with a metal such as copper or by diazotizing the amino group and treating with copper, either with or without intermediate replacement of the amino group with halogen.

Having now described our invention, what we claim as new and desire to secure by Letters Patent is:—

1. The process which comprises the production of 1:1'-dianthraquinonyls containing acid substituents in the 2:2'-positions by the condensation of anthraquinone containing acid substituents selected from the group consisting of chlorine, bromine and sulphonic acid in the 2-position and reactive substituents selected from the group consisting of chlorine and bromine in the 1-position, and heating with copper powder.

2. A process for the production of 1:1'-dianthraquinonyls containing chlorine in the 2:2'-positions, by boiling 1:2-dichloro-anthraquinone with copper powder.

In testimony whereof we have signed our names to this specification.

WILLIAM SMITH.
JOHN THOMAS.